May 1, 1928.  1,668,329
J. M. MILLER
TEAPOT
Filed Nov. 12, 1926
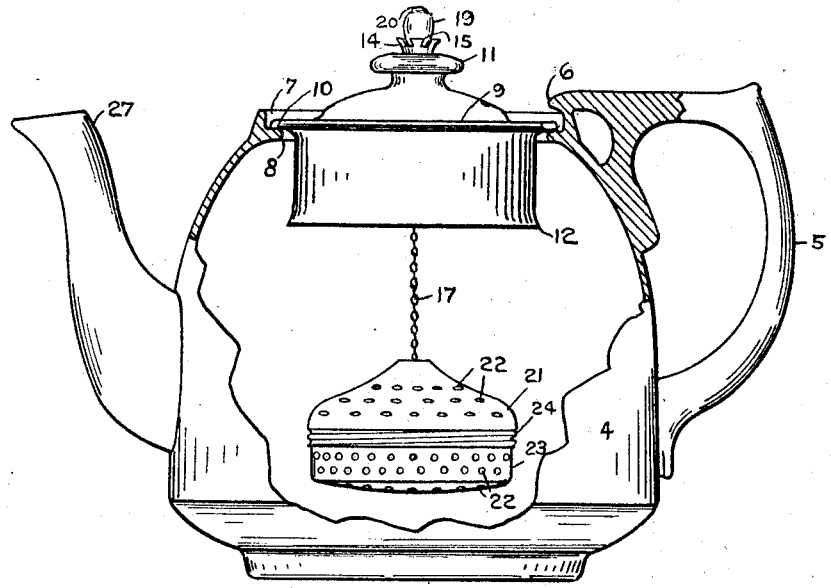
Fig. 1
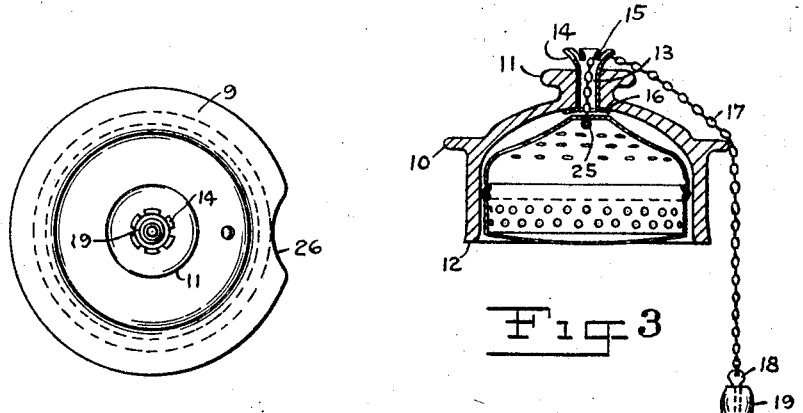
Fig. 2
Fig. 3
Inventor
John Meredith Miller
By his Attorney
Clarence G. Campbell Patented May 1, 1928.

1,668,329

UNITED STATES PATENT OFFICE.

JOHN MEREDITH MILLER, OF MONTCLAIR, NEW JERSEY, ASSIGNOR TO MADDOCK & MILLER, INC., OF NEW YORK, N. Y., A CORPORATION OF NEW YORK.

TEAPOT.

Application filed November 12, 1926. Serial No. 147,857.

My invention relates to an improvement in a tea pot and its novelty lies in the adaptation and arrangement of parts as will be more fully hereinafter pointed out.

It has become the general practice in the art of making tea to avoid the long exposure of the tea leaves to the boiling water in order to avoid the making of tannic acid and other undesirable qualities in the tea, and the tea ball has been found to be the easiest manner in which to handle this problem. There are however, numerous forms of tea balls none of which adequately meet the requirement of simple and positive handling to secure the desired result as they all necessitate the opening of the tea pot during the infusion thereby losing some of the more volatile and desirable flavors or do not permit of the positive withdrawal of the tea leaves from the tea when the infusion is complete.

My device solves this problem furnishing a complete tea pot of Rockingham ware having a cover containing all of the necessary elements in combination so that the tea leaves can be readily exposed to the necessary infusion but permitting a simple and quick withdrawal from the infusion when it is completed without the necessity of opening the tea pot and permitting a second or continued infusion if upon test the brew is not strong enough, also without the necessity of the removal or opening of the cover from the pot. The using of Rockingham ware insuring no metallic flavor in the tea infusion and protecting all of the aromatic and delicate flavors of the same.

My device therefore in a very simple manner provides means for easily and quickly making tea of the desired strength and permits of the complete removal of the cover and combined parts for a complete cleansing and airing after the brewing of the tea.

Referring to the drawings Figure 1 is a side elevation of my tea pot, a substantial portion being broken away in order to show the interior construction.

Figure 2 is a top plan view of the cover with the tea ball in the lowered position as shown in Figure 1.

Figure 3 is a side view of the cover in cross section through the center thereof and showing the tea ball and connecting parts in the enclosed position in the cover.

In the drawings 4 is a tea pot of ordinary construction having a handle 5 which terminates at its upper inner end in a projection 6 and the tea pot 4 has an opening 7 at its upper end which opening has an in-turned flange 8. On this flange 8 is adapted to be mounted a cover 9 which has an out-turned flange 10 adapted to rest upon the in-turned flange 8 of the tea pot 4. The cover 9 terminates at its upper end in a circular handle 11 and at its lower end in a deep circular down-turned flange 12 which is adapted to set inside of the in-turned flange 8 of the pot 4.

A cylindrical metal tube 13 is adapted to be mounted in a circular opening formed in the handle 11 of the cover 9 which is outwardly flared at its upper end at 14 and which flared portion 14 is cut into locking slots 15 and the lower end of said cylindrical tube 13 is turned back at 16 thereby securing the lower end of said tube 13 rigidly in position as the upper end of said tube 13 is secured by the flare 14. A chain 17 is adapted to be mounted in said tube 13 so as to slide through the same readily in either direction and a pin 18 is rigidly secured to the link at the upper end of said chain 17 and a ball 19 is secured over said pin 18 by means of a rivet cap 20 in the usual well known manner and the ball 19 is adapted to fit into and rest in the flared portion 14 of the tube 13. A tea ball or tea container 21 having perforations 22 and a lower portion 23 threaded to the lower portion of 21 in the usual well known manner at 24 is secured to the lower end of the chain 17 by means of the ring 25. The tea ball 21 is shaped so as to exactly fit the inside of the cover 9 when it is pulled up to its upper position as is shown in Figure 3. The cover 9 also has a cut out portion 26 in the out-turned flange 10 which cut out portion 26 is adapted to slide over the projections 6 of the handle 5 of the tea pot 4 thereby permitting the tea pot cover 9 to be placed in position on the tea pot so that the out-turned flange 10 will rest upon the in-turned flange 8 of the tea pot 4 and the turning of the handle 11 will place the cut out portion 26 in a position so that it will not slip over the projection 6 thereby insuring the locking of the cover 9 against accidental removal from the tea pot 4.

In using my device the cover 9 in the position as shown in Figure 1 will be removed by bringing the cut out portion 26 in direct alignment with the projection 6 of the handle 5 of tea pot 4 thereby permitting the removal of the cover 9 and the lower portion 23 of the tea ball 21 will be removed by unscrewing the same at 24 and the desired amount of tea will be placed in the tea ball 21 and the lower portion 23 restored to position thereon and the teapot 4 having been filled with boiling water to the desired height, which will be below the lower edge of the down-turned circular flange 12 when in position on the pot 4, the cover 9 will be placed in position on the tea pot 4 sliding the cut-out portion 26 over the projection 6 and turning the cover 9 so as to place the cut out portion 26 out of alignment with projection 6. The tea ball 21 containing the tea will be then allowed to infuse the desired length of time until the tea being made upon test shows the required strength when the tea ball 21 will be pulled out of the water into its encased position in the cover 9 by means of the ball 19 which serves as a handle for this purpose, and the chain 17 will be dropped into one of the slots 15 of the flared portion 14 so as to secure said chain in a fixed position thereby holding the tea ball 21 in a fixed position entirely within the cover 9 and entirely out of the water.

The tea pot 4 may then be used to pour out tea in the usual manner as desired through a spout 27. The tea ball 21 may be again lowered into the water at any time desired by taking hold of the ball 19 and releasing the chain 17 from the slot 15 and the cover 9 may be removed from the tea pot 4 as already described whenever desired and the exhausted tea leaves removed from the tea ball 21 by the removal of the lower portion 23 of the tea ball 21 and new tea supplied for a continued operation.

It is particularly pointed out that the combination of the cover 9 with the tea ball 21, the chain 17, the cylindrical tubular member 13 with the flare 14 and slots 15 and the ball 19 secured to the upper end of the chain 17 furnish one complete unit which is quickly and readily removed from the tea pot 4 permitting the washing or refilling of the tea ball 21 with new tea so that it is not only simple and positive but is also complete so that parts may not be mislaid nor wrongly adjusted.

It will be understood that many variations may be made in the construction of my device without departing from the spirit and intent of the invention.

I claim:

1. In a tea pot the combination of a body, a cover adapted to fit thereon, means for locking said cover against accidental removal, a tube through said cover having locking slots at its upper end, a chain passing through said tube having a ball at its upper end and a tea ball secured to the lower end of said chain adapted to exactly fit inside of said cover.

2. In a tea pot cover the combination of a tube passing through the handle of the same having a flared portion at its upper end with slots therein, a chain passing through said slot having a ball secured to its upper end and adapted to seat in said tube flare and a tea ball secured to the lower end of said chain adapted to fit exactly the inside of said cover.

3. In a tea pot cover the combination of a handle at the top of the same, a tube mounted therethrough having a flare at its upper end with slots around the edge of the same, a chain mounted so as to readily pass through said tube having a ball secured to its upper end said ball being adapted to seat in said flare, a tea ball secured to the lower end of said chain and adapted to lie in its upper position entirely within the inside of said cover.

4. The combination in a complete unit adapted to be readily removed from and replaced on a tea pot of a deep flanged cover having a central aperture through a handle at the top, a tube mounted in said aperture having a flared slotted portion at its upper end, a chain mounted through said tube adapted to be locked in any desired position in said slotted portion, a ball secured to the upper end of said chain adapted to seat in said flared portion of the tube, a tea ball secured to the lower end of said chain and adapted to be entirely contained within said cover in its upper position.

5. The combination in a complete unit adapted to be readily removed from and replaced on a tea pot of a deep flanged cover having a central aperture through a handle at the top, a tube mounted in said aperture having a flared slotted portion at its upper end, a chain mounted through said tube adapted to be locked in any desired position in said slotted portion, a ball secured to the upper end of said chain adapted to seat in said flared portion of the tube, a tea ball secured to the lower end of said chain and adapted to be entirely contained within said cover in its upper position and means for locking said cover on said pot against accidental removal therefrom.

6. The combination in a complete unit adapted to be readily removed from and replaced on a tea pot of a deep flanged cover having a central aperture through a handle at the top, a tube mounted in said aperture having a flared slotted portion at its upper end, a chain mounted through said tube adapted to be locked in any desired position in said slotted portion, a ball secured to the upper end of said chain adapted to seat in said flared portion of the tube, a tea ball secured to the lower end of said chain and adapted to be entirely contained within said cover in its upper position and means for locking said cover on said pot against accidental removal therefrom comprising a slot in the outer edge of said cover adapted to slip over a projection on the inner end of the handle of the pot.

In testimony whereof I affix my signature.

JOHN MEREDITH MILLER.